US008234286B2

(12) United States Patent
Hsu et al.

(10) Patent No.: US 8,234,286 B2
(45) Date of Patent: Jul. 31, 2012

(54) MEDIA LIST SERVER AND METHOD FOR GENERATING FAVORITE MEDIA LIST

(75) Inventors: Chun Hsu, Taipei Hsien (TW); Deng-Rung Liu, Taipei Hsien (TW); Chung-Chih Yeh, Taipei Hsien (TW); Chi-Chang Lu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 377 days.

(21) Appl. No.: 12/622,702

(22) Filed: Nov. 20, 2009

(65) Prior Publication Data

US 2011/0029544 A1    Feb. 3, 2011

(30) Foreign Application Priority Data

Aug. 3, 2009    (CN) .......................... 2009 1 0305109

(51) Int. Cl.
*G06F 17/30* (2006.01)
(52) U.S. Cl. ...................................................... 707/749
(58) Field of Classification Search .................. 707/609, 707/705, 709, 741, 749, 802, 913, E17.009
See application file for complete search history.

(56) References Cited

U.S. PATENT DOCUMENTS

| 2003/0227478 | A1* | 12/2003 | Chatfield ........................ 345/751 |
| 2005/0071375 | A1* | 3/2005 | Houghton et al. ........... 707/104.1 |
| 2007/0220114 | A1* | 9/2007 | Kaarela et al. ................. 709/219 |

* cited by examiner

*Primary Examiner* — Fred I Ehichioya
(74) *Attorney, Agent, or Firm* — Altis Law Group, Inc.

(57) ABSTRACT

A media list server communicating with a plurality of media database servers and a client device comprises a receiving module, a storing module, a recording module, a determining module, a calculating module and a list generating module. The receiving module receives a user identification information and vote information. The storing module stores properties of the media and weights of the properties. The recording module records the vote information. The determining module determines whether a user has logged in for the first time according to the user identification information, and determines a popularity of each media according to the vote information. The calculating module calculates similarities of the media according to the properties and weights of the properties. The list generating module generates the favorite media list according to the popularity and the similarities of the media.

15 Claims, 7 Drawing Sheets

MEDIA LIST SERVER AND METHOD FOR GENERATING FAVORITE MEDIA LIST

BACKGROUND

1. Technical Field

The present disclosure relates to a media list server and a method for generating a favorite media list.

2. Description of Related Art

With developments in technology, digital televisions are more popularly used, such that favorite media can be viewed according to interest. However, the favorite media must be selected from the entire database provided, which not only uses excessive time, but may also be inconvenient.

Additionally, the favorite media that are selected are often not stored each time, causing the classification of the media as being favorites to be deleted at log off of the server or network resource. Subsequent visits require completely new classification procedures.

DETAILED DESCRIPTION

Figure 1:
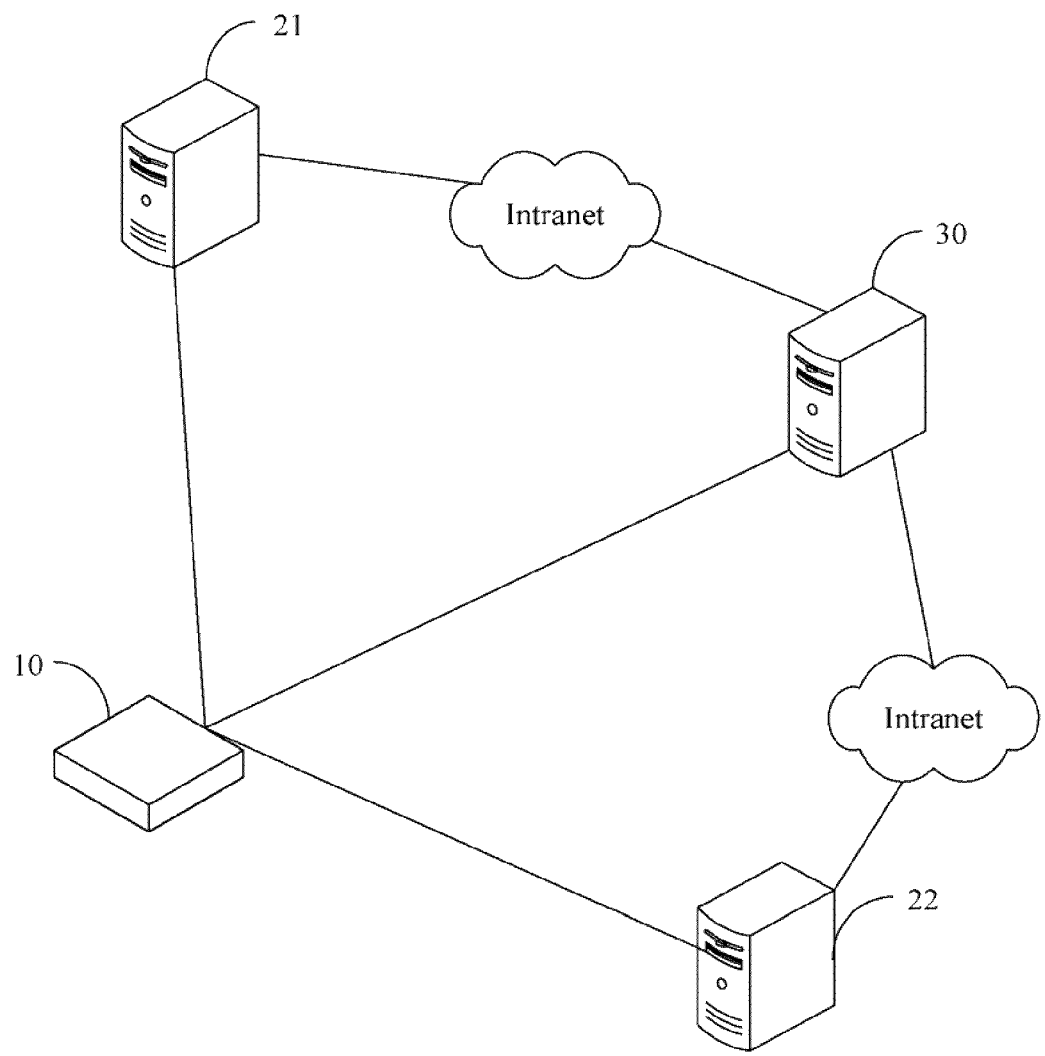
FIG. 1 is an application schematic diagram of one embodiment of a media list server system of the present disclosure.

FIG. 1 is an application schematic diagram of a media list server system of the present disclosure, which comprises at least one client device 10, two media database servers 21, 22 and a media list server 30. In one embodiment, the media database servers 21, 22 store a plurality of media. The client device 10 is connected to the media database servers 21, 22 and the media list server 30 to play the media. The media list server 30 is also connected to the media database servers 21, 22 via Intranet, to generate and update a favorite media list. When requested, the media list server 30 generates the favorite media list. The client device 10 downloads corresponding media from the media database servers 21, 22 according to the favorite media list. In one embodiment, there are two media database servers 21, 22, although in other alternative embodiments, other numbers are employed. In one embodiment, the at least one client device 10 may comprise a set-top-box (STB), or a portable device, for example. The media stored in the media database servers 21, 22 comprise songs, and/or music videos, for example.

Figure 2:
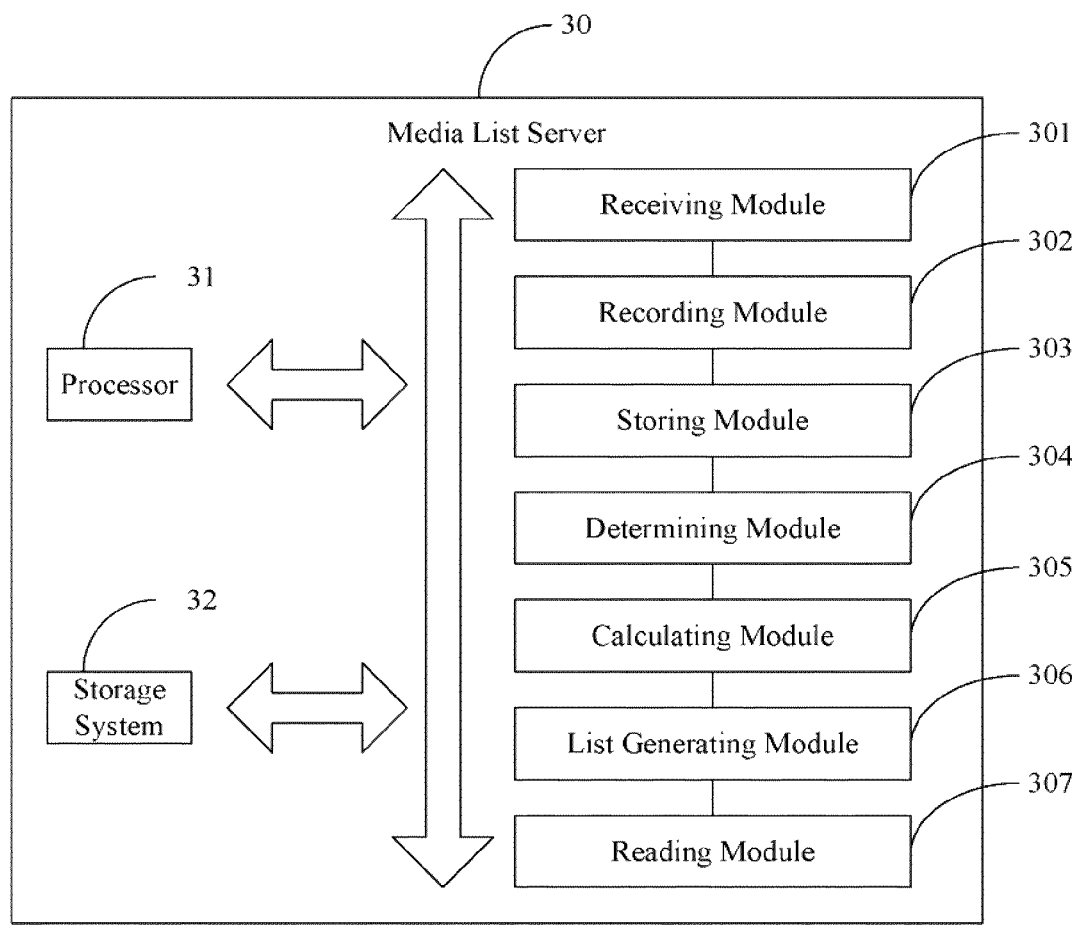
FIG. 2 is a block diagram of one embodiment of the media list server of FIG. 1.

FIG. 2 is a block diagram of one embodiment the media list server 30 of FIG. 1. The media list server 30 comprises a processor 31, a receiving module 301, a recoding module 302, a storing module 303, a determining module 304, a calculating module 305, a list generating module 306 and a reading module 307. One or more computerized codes of the modules 301-307 may be stored in a storage system 32 of the media list server 30, to be executed by the processor 31.

The receiving module 301 receives user identification information and vote information. In this embodiment, the user identification information comprises a user name and a password. Only when the user inputs her/his user name and password correctly via a remote controller, the media list server 30 can execute corresponding function to generate the favorite media list. In addition, the vote information comprises a vote type (a positive vote or a negative vote), and a vote amount, for example. To each media, the user can choose a positive vote or a negative vote according to his/her favorite. Thus, the media list server 30 can determine user favorite degree to the media (detailed described in FIG. 5).

The recording module 302 records the vote information. In one embodiment, the vote information in the recording module 302 can be replaced. The vote information of a media playing from start to end is regarded as one round of vote information. For one media, which is may be played several times, the recording module 302 records the last round vote information, for example, the first round vote information can be replaced by the second round vote information when the recording module 302 receives a vote in the second round. Especially, in one round of vote information, the user can choose the negative vote only once, however, can choose the positive vote several times (detailed described in FIG. 4).

The storage module 303 stores properties of all media and weights of the properties. The properties of each media can comprise a title, a performer, a media type (e.g., songs, music video, movie, news), a pacing (e.g., slow, quick), a reaction (e.g., serious, amusing), a media language, a director and an author/composer and others. In one embodiment, the property types of each media can be divided into quantifiable properties and non-quantifiable properties. For example, the pacing and the reaction belong to the quantifiable properties, and can be expressed by a value 1~5 to indicate pacing from slow to fast and reaction from serious to amusing. Here, the values 1~5 are defined as quantifiable values. Other than reaction and pacing, the other properties of the media belong to the non-quantifiable properties.

At the same time, properties of each media carry individual weights, which comprise preset weights and calculated weights. The preset weights are preset by the media list server 30 for every property of the media, such as, in one embodiment, the preset weights of the title, the performer, the media type, the reaction, the pacing, the media language, the director and the author/composer being 2, 20, 20, 15, 15, 5, 3 and 5 respectively, all of which can be adjusted by actual requirement and are not limited thereto. The calculated weights are obtained by comparing the properties of not-played media to these of played media, as follows. In one embodiment, all the weights of the properties of the media added together cannot exceed 100.

The determining module 304 determines a popularity for each media according to the vote information, that is, whether a media is a favorite or not. At the same time, the determining module 304 also determines whether a current user is logged into the media list server 30 for the first time according to the user identification information.

The calculating module 305 calculates similarities of the media according to the properties stored in the storing module 303. In one embodiment, the similarities of the media that are only the not-played media are obtained by adding the calculated weights of the properties (detailed description shown in FIG. 6).

The list generating module 306 generates the favorite media list according to the popularity and similarities of the media. In one embodiment, each favorite media list comprises one type of media, such as, a favorite song list, a favorite music video list, for example.

Figure 3:
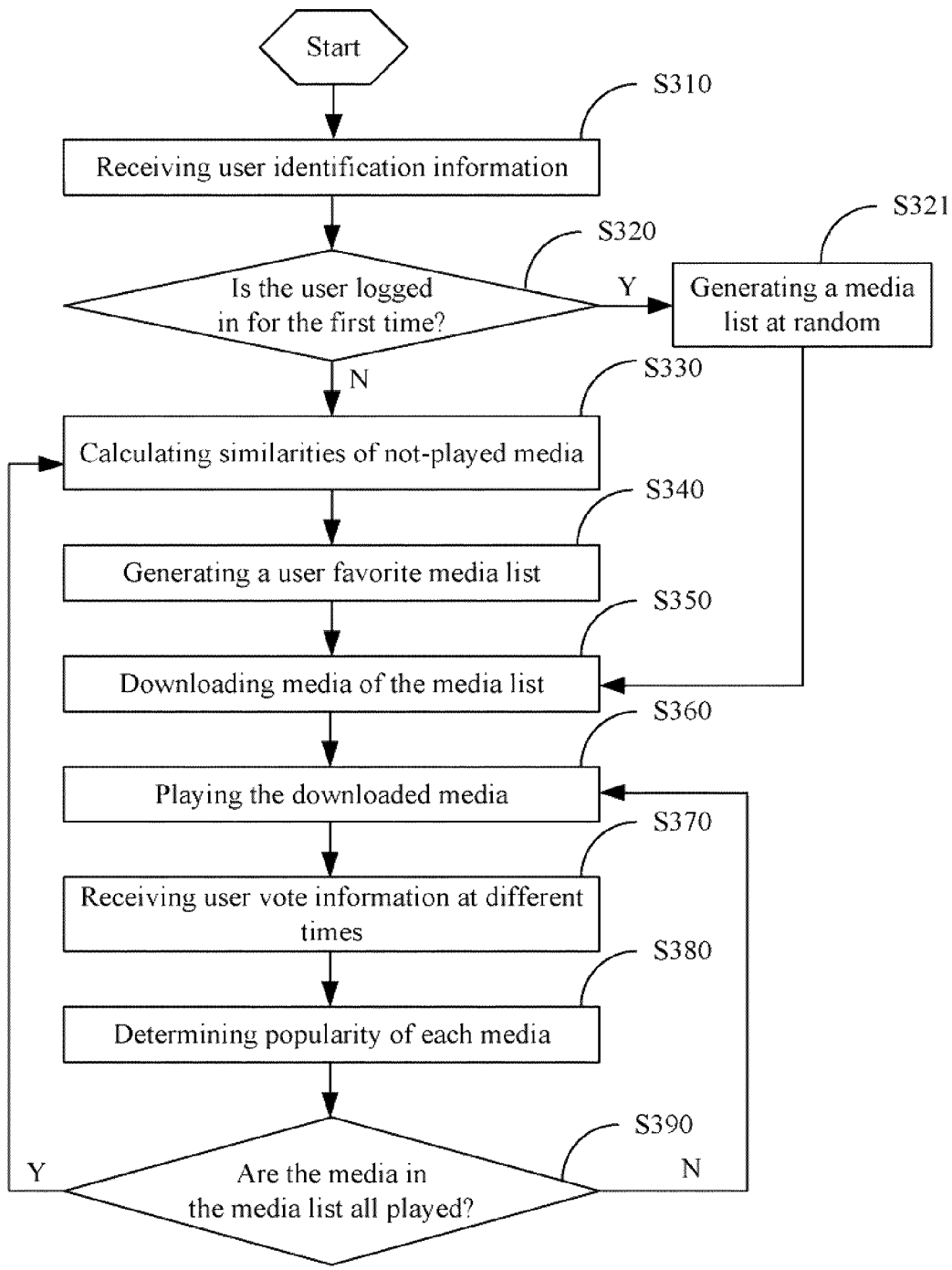
FIG. 3 is a flowchart of one embodiment of a method for generating a favorite media list of the present disclosure.

FIG. 3 is a flowchart of one embodiment of a method for generating a favorite media list of the present disclosure. First of all, the user only chooses one type of media when entering the media list server 30 each time. In step S310, the receiving module 301 receives user identification information. In step S320, the determining module 304 determines whether the user is logged into the media list server 30 for the first time according to the user identification information. In other alternative embodiments, the media list server 30 identifies the user by other means, such as identifying the user by an identification number of the client device 10 connected thereto. If the user is logged into the media list server 30 for the first time, step S321 is implemented and the list generating module 306 generates a favorite media list at random.

If the user is not logged into the media list server 30 for the first time, step S330 is implemented, and the calculating module 305 calculates similarities of the not-played media. Here, the calculating module 305 calculates similarities of the not-played media of the user who had logged off previously. In one embodiment, the similarities of the not-played media are calculated based on the weights of properties of the played media. For example, if one hundred media are provided and each media list comprises 10 media, there are 90 media remaining when the first round media list is played. If the first round media list comprises media from the first to tenth, the remaining 90 media are the eleventh to the hundredth. After the first media list is completely played, the calculating module 305 calculates the similarities of the media from the eleventh to the hundredth based on the first to the tenth respectively. In other words, similarities of the eleventh media are calculated based on the first media to the tenth media, that is, there are 10 similarity values been calculated. Then, a maximum value chosen from the 10 similarity values is regarded as a similarity of the eleventh media. According to this regulation, similarities of all not-played media can be calculated.

Figure 6:
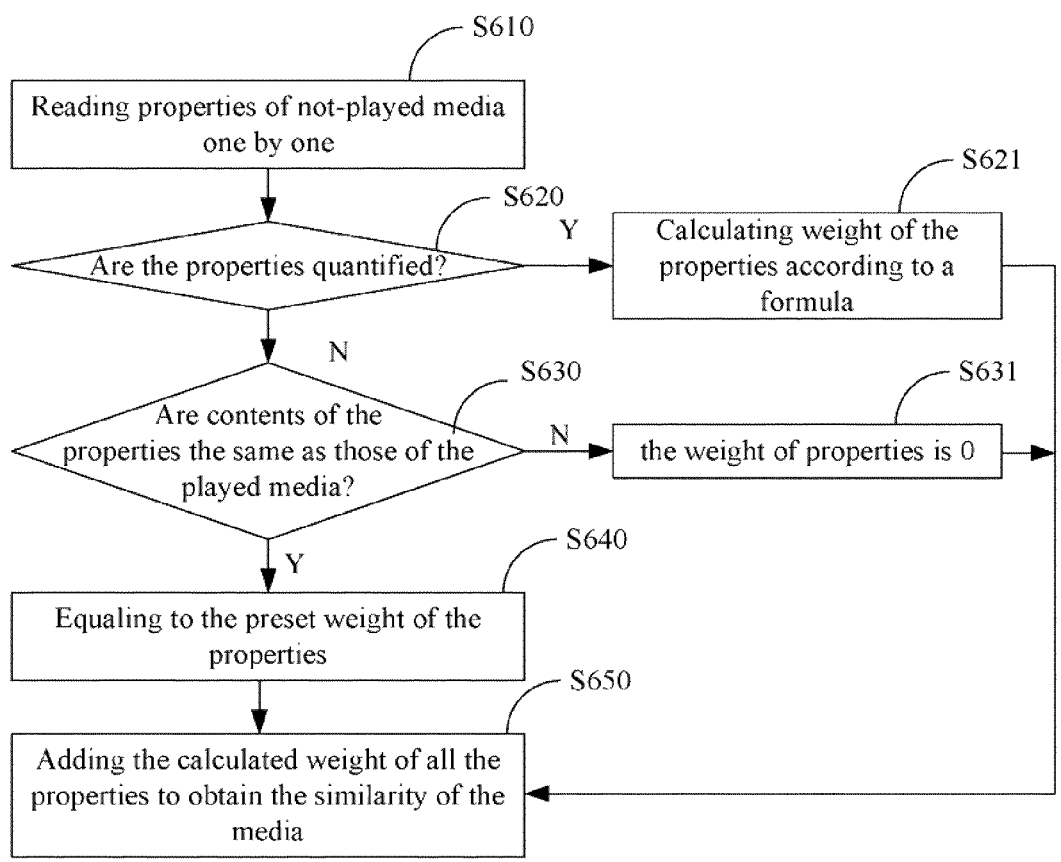
FIG. 6 is a detailed flowchart of one embodiment of a step S330 of FIG. 3.

A detailed calculation method is shown in FIG. 6, in which, in step S610, the reading module 307 reads properties of a not-played media of the storing module 303 one by one. In step S620, the determining module 304 determines whether the read properties are respectively quantifiable. If the read properties are quantifiable, step S621 is implemented, and the calculating module 305 calculates the weights of the quantifiable properties according to a formula: $(1-A/B)*C$. In one embodiment, A is a difference in the quantifiable properties between one played media and one not-played media. B is an integer value indicating a difference between a maximum and a minimum value of the quantifiable properties. For example, the quantifiable values of the reaction and the pacing are from 1~5, thus, the difference between the maximum and the minimum value of the quantifiable properties is 4. C represents the preset weights of the quantifiable properties.

If the properties are non-quantifiable, step S630 is implemented, in which the determining module 304 determines whether contents of the non-quantifiable properties of one not-played media are the same as those of the played media.

If the contents are the same, in step S640, the weights of the non-quantifiable properties equal the preset weights. If the contents are different, in step S631, the weights of the non-quantifiable properties are 0. In step S650, the calculating module 305 adds the calculated weights of all the properties of each media to obtain the similarity of the media.

For example, if the first media is played, the properties and contents thereof are title—"Ma De Li Bu Si Yi", performer—"Jolin Tsai", media type—"music", reaction—"5", pacing—"4", media language—"Chinese", director—"Meng-Qi Chen", and author/composer—"Jun-Lang Huang". If the eleventh media is not-played, the properties and contents thereof are title—"Kan Wo Qi Shi Er Bian", performer—"Jolin Tsai", media type—"music", reaction—"3", pacing—"5", media language—"Chinese", director—"Chuan-Zhen Chen", and author/composer—"Edward Chan/Charles Lee". In one embodiment, weights of properties of the first media are the preset weights, and weights of properties of the eleventh media are the calculated weights. That is, weights of the properties of the eleventh media are calculated based on those of the first media.

Firstly, the determining module 304 determines whether contents of corresponding non-quantifiable properties of the first media and the eleventh media are the same, in other words, determines whether contents of the title, the performer, the media type, the media language, the author/composer and the director of the first media and the eleventh media are the same. For example, if the contents of the title, the director and the author/composer of the first media and the eleventh media are all different, weights of these properties are 0. Conversely, if the contents of the performer, the media type and the media language of the first media and the eleventh media are the same, weights of these properties of the eleventh media are the present weights, such as, 20, 20, 5 respectively.

Secondly, the calculating module 305 calculates weights of the quantifiable properties of the eleventh media according to the above formula.

As to value of the reaction, the first media is 5, and the eleventh media is 3. Thus, the calculated weight of the reaction of the eleventh media is 7.5 according to the formula $(1-(5-3)/4*15=7.5)$. Consequently, the calculated weight of the pacing of the eleventh media is 11.25 according to the formula $(1-(5-4)/4*15=11.25)$.

Finally, the similarity of the eleventh media is calculated by adding all weights thereof, that is, the similarity of the eleventh media=title (0)+performer (20)+media type (20)+reaction (7.5)+pacing (11.25)+media language (5)+director (0)+author/composer (0)=63.75.

Figure 5:
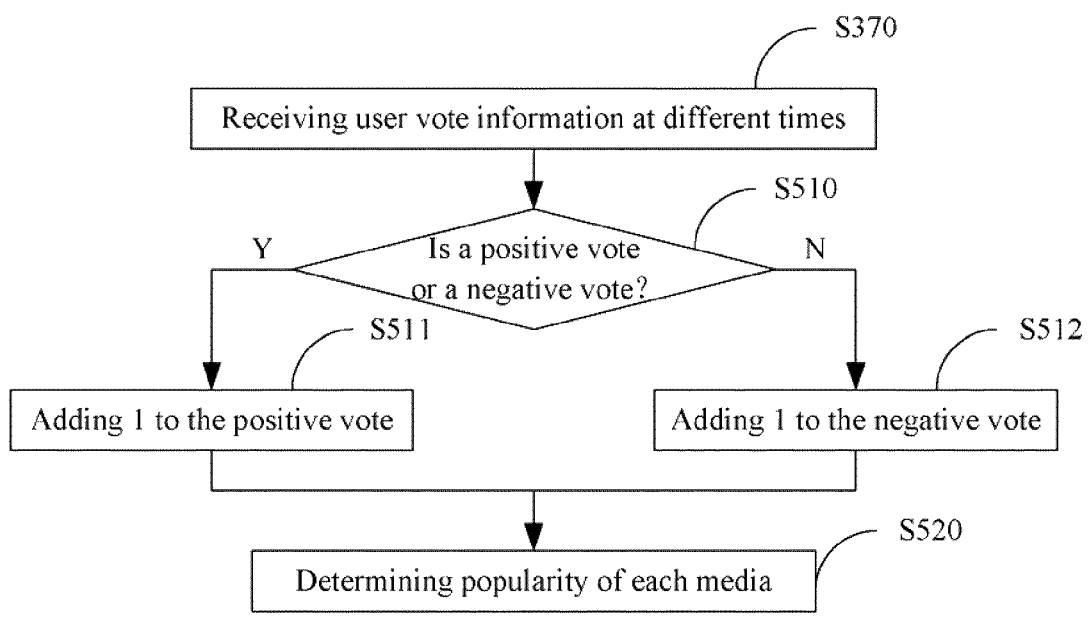
FIG. 5 is a detailed flowchart of one embodiment of a step S380 of FIG. 3.

After similarity has been calculated, as shown in FIG. 3, in step S340, a new favorite media list is generated according to the calculated similarity and the popularity (seen FIG. 5). In one embodiment, media of the favorite media list are chosen from a first group of media with relatively favorable values and the similarities thereof exceeding a preset value (60), and a second group of media with similarities thereof lower than the preset value. The list generating module 306 chooses 10 media at random from the two groups based on a preset ratio (choosing 8 media from the first group and choosing 2 media from the second group) to generate the favorite media list. In one embodiment, the media chosen from the two groups can be modified, with no limit thereto. Choice of one or more media with similarity lower than 60 is that because the media belonged thereto may also comprise user favorite media that are not viewed before, in this way, the popularities of the lower similarity media can be added.

In step S350, the client device 10 downloads the media of the media list generated in step S321 or S340 from the media database server 21 or 22. In step S360, the client device 10 plays the downloaded media.

In step S370, the receiving module 301 receives the vote information at different time. In other words, the user can vote at different time when one media is playing.

In step S380, the determining module 304 determines a popularity based on the vote information of one media.

In step S390, determining module 304 determines whether all the media in the media list have been finished. If the media have not been finished, step S360 is repeated and the client device 10 plays the remaining not-played media in the media list one by one. If all the media have been finished, step S330 is repeated, and the calculating module 305 calculates the similarities of not-played media of the media list.

Figure 4:
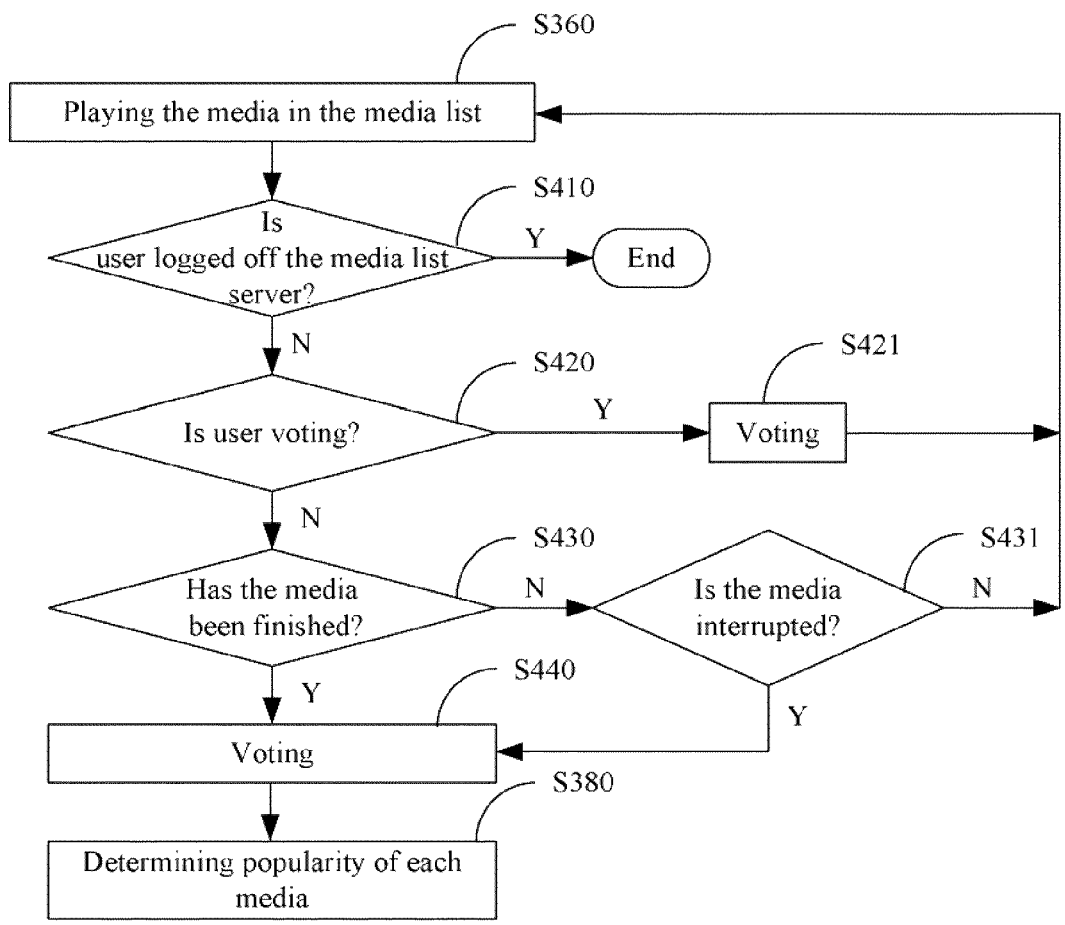
FIG. 4 is a detailed flowchart of one embodiment of a step S370 of FIG. 3.

FIG. 4 is a detailed flowchart of the step S370 of FIG. 3. Following steps are executed in one media playing. In step S410, the determining module 304 determines whether the user is logged off the media list server 30. When the user is logged off, the media list server 30 stops to provide a service of generating the favorite media list, and the client device 10 stops to play the medias. If the user is logged off the media list server 30, the process is finished. If the user is not logged off the media list server 30, step S420 is implemented, in which the determining module 304 determines whether a vote has been registered according to the vote information of the receiving module 301. If the user votes, step S421 is implemented, the vote is registered and the receiving module 301 receives vote information. At this moment, the vote information is preset to the positive vote. Step S360 is repeated.

If no vote is received, step S430 is implemented, and the determining module 304 determines whether the media has been finished. If the media has been finished, step S440 is implemented and a vote is registered, that is, the receiving module 301 receives the vote information again. Similarly, the vote information is also preset to the positive vote.

If the media has not been finished, in step S431, the determining module 304 determines whether the media was interrupted while it was being played. If the user does not stop the media, step S360 of FIG. 3 is repeated. If the user stops the media, in step S440, the vote is registered. At this moment, the vote information is preset to the negative vote, indicating a negative reaction from the user.

In one embodiment, if no vote is submitted after the media has been finished, the vote information is preset to the positive vote, that is, a favorable user reaction from the media. If no vote is registered when one media is stopped, the vote information is preset to the negative vote, that is, a negative user reaction.

Three different opportunities are provided for user votes to be registered, specifically, while playing, when the media is interrupted by the user, and after the media is finished normally.

FIG. 5 is a detailed flowchart of the step S380 of FIG. 3. In step S510, the determining module 304 determines whether the vote information is positive vote or negative vote. If the vote information is the positive vote, in step S511, the recording module 302 adds one to the positive vote total. The amount of the positive vote is a positive number, added when the receiving module 301 receives the positive vote.

If the vote information is negative vote, in step S512, the recording module 302 adds one to the negative vote total. In one embodiment, when a media is stopped during playing, one negative vote is registered. The amount of the negative vote is a negative number.

In step S520, the determining module 304 determines the popularity of a media according to the total positive or negative votes. When a media is stopped, the recording module 302 records one negative vote and 0 positive votes. When a media is stopped after a positive vote is registered, the recording module 302 records one negative vote and one positive vote. Thus, the media is preset and deemed a favorite media. When a positive vote is registered multiple times during a playing, obviously, the media is deemed popular.

In one embodiment, because the similarity of each not-played media is calculated based on the played media, the played media comprise both favorite media and unpopular media, whose vote information can be a positive value or a negative value, the similarity of each not-played media can be a positive value or a negative value. Accordingly, the similarity is chosen according to a regulation as following: comparing a maximum value of the positive values with a maximum absolute value of the negative values to choose a larger one, and the popularity of the not-played media equaling that of the large one, whereby if both maximum values are equal, the not-played media is deemed a favorite media.

For example, if the similarities of the eleventh media are calculated to 10 values (six positive values and four negative values) according to the first to tenth media, a maximum positive value (78) of the six positive values is chosen, and a maximum absolute value (70) of the four negative values is chosen. With 78 exceeding 70, the eleventh media is deemed a favorite media. If the maximum absolute value of the four negative values is 80, the eleventh media is deemed an unpopular media due to 78 being less than 80. Therefore, all the media have individual popularity when every media list is finished, and the similarity of one media can be the same or the different.

Figure 7:
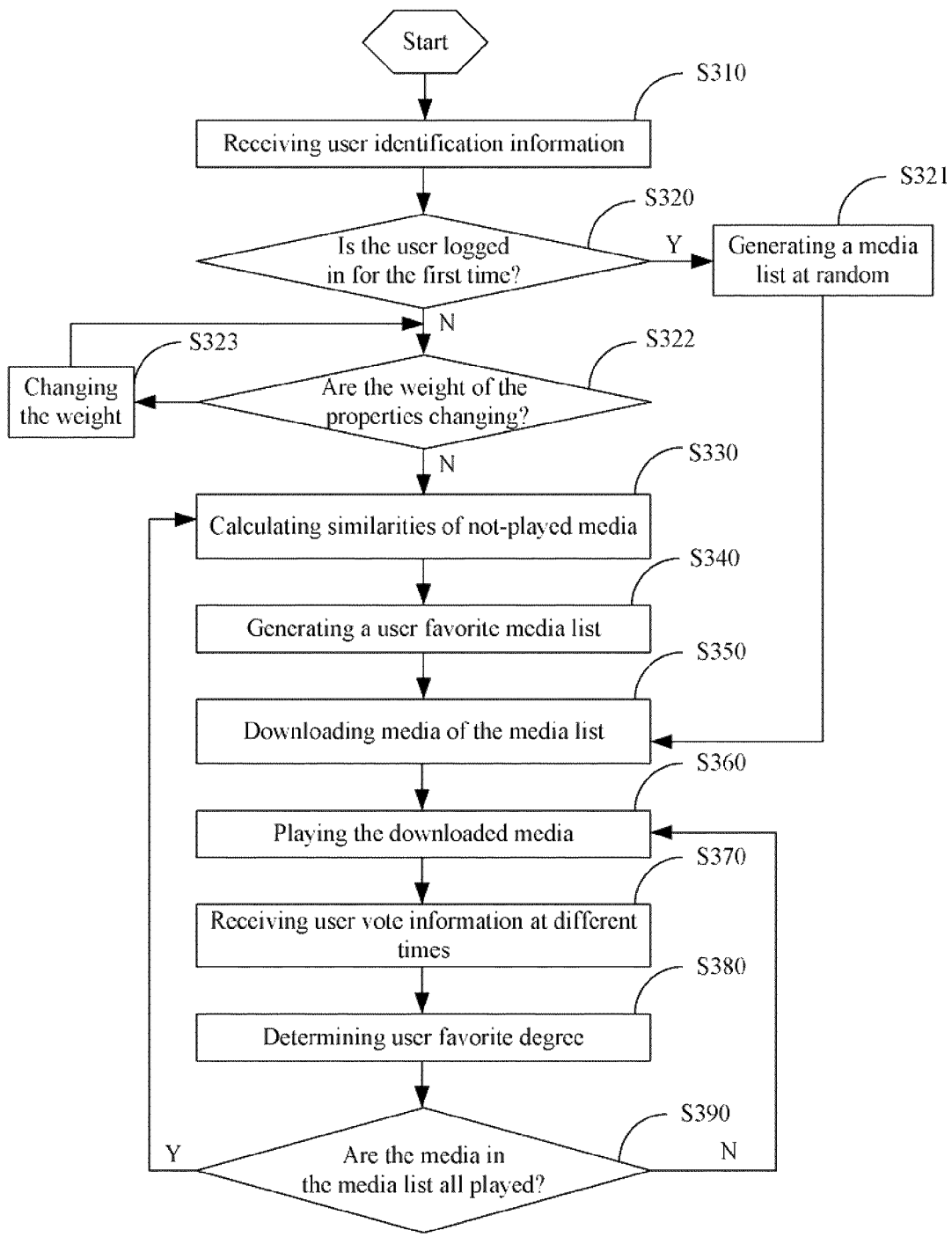
FIG. 7 is a flowchart of another embodiment of a method for generating a favorite media list of the present disclosure.

FIG. 7 is a flowchart of another embodiment of a method for generating a favorite media list, differing from that of FIG. 3 in that, here, in step S322, if the user does not logged into the media list server 30 for the first time, the determining module 304 determines whether the weights of properties of the media have to be changed. If the weights of the properties of the media need to be changed, in step S323, the media list server 30 changes the weights of the properties of the media and stores them in the storing module 303 to replace former weights. If the weights of the properties of the medias do not need to be changed, in step S330, the calculating module 305 calculates similarities of the not-played media.

In the disclosure, the media list server 30 and media list generating method utilize vote information to assess and provide popularity, with the media list server 30 calculating similarities between the media according to weights thereof at the same time. Thus, a favorite media list is generated based on the calculated similarities and the popularity.

Although the features and elements of the present disclosure are described in various inventive embodiments in particular combinations, each feature or element can be configured alone or in various within the principles of the present disclosure to the full extent indicated by the broad general meaning of the terms in which the appended claims are expressed.

What is claimed is:

1. A media list server in communication with a media database server and at least one client device, to generate a favorite media list, wherein the media database server stores a plurality of media, and the at least one client device is used to play the media, the media list server comprising:

a storing module to store properties of the media and corresponding weights of the properties, wherein the properties of each media comprise quantifiable properties and non-quantifiable properties, wherein the quantifiable properties comprise a pacing and a reaction of the media, and the non-quantifiable properties comprise selected one or more of a title, a performer, a media type, a media language, a director and an author/composer of the media, wherein the weights comprise preset weights and calculated weights, wherein the preset weights are preset by the media list server for the properties, and the calculated weights of the not-played media are calculated based on the weights of the played media;

a receiving module to receive user identification information and vote information from the at least one client device;

a recording module to record the vote information into a storage system of the media list server;

a determining module to determine whether a user is logged into the media list server for the first time according to the user identification information, and determine a popularity of each media according to the vote information;

a calculating module to calculate similarities of the media according to the properties and the corresponding weights of the properties;

a list generating module to generate and update the favorite media list according to popularity of and the similarities between the media; and a processor to execute the receiving module, the recording module, the determining module, the calculating module and the list generating module.

2. The media list server as claimed in claim 1, further comprising a reading module executed by the processor to read the properties of the media one by one.

3. The media list server as claimed in claim 1, wherein the determining module further determines whether all of the media in the favorite media list have been finished.

4. The media list server as claimed in claim 1, wherein the similarities of the not-played media are obtained by adding all calculated weights of the properties thereof.

5. The media list server as claimed in claim 1 wherein weight calculation of the quantifiable property is based on a formula: $(1-A/B)*C$, wherein A is a difference of the quantifiable property between one played media and one not-played media, B is an integer value indicating a difference between a maximum and a minimum value of the quantifiable property, and C represents the preset weights of the quantifiable property.

6. The media list server as claimed in claim 1, wherein weight calculation regulation of the non-quantifiable property as following: when contents of corresponding properties of the played media are the same as those of the not-played media, the weights of the properties of the not-played media equal the preset weights thereof, and otherwise, the weights of the properties of the not-played media are 0.

7. A method for generating a favorite media list by a media list server, comprising:

receiving user identification information;

determining whether the user is logged into the media list server for the first time; and if the user is not logged into the media list server for the first time, calculating similarities of not-played media;

generating a favorite media list according to the similarities of the media and popularity;

playing the media in the favorite media list one by one;

receiving vote information at different time;

determining the popularity according to the vote information;

determining whether all the media in the favorite media list are finished; and calculating the similarities of the not-played media, if all the media in the favorite media list are finished;

wherein calculating similarities between the not-played media comprises:

reading the properties and the contents of the properties of a not-played media;

determining whether the read properties are quantifiable;

calculating weights of the quantifiable properties according to a formula, if the read properties are quantifiable;

determining whether contents of corresponding properties of the not-played media and the played media are the same, if the read properties are non-quantifiable;

weights of the non-quantifiable properties of the not-played media equaling those of the preset properties, if the contents are the same;

weights of the non-quantifiable properties of the not-played media are 0, if the contents are different; and adding all the weights of the properties to obtain the similarities.

8. The method as claimed in claim 7, further comprising generating a media list at random if the user is not logged into the media list server for the first time.

9. The method as claimed in claim 7, further comprising playing the remaining media in the favorite media list, if all the media in the favorite media list are not finished.

10. The method as claimed in claim 7, further comprising steps of:

determining whether the weights of the properties of the media to be changed; and changing the weights of the properties of the media if the weights need to be changed.

11. The method as claimed in claim 7, wherein the formula is $(1-A/B)*C$, wherein A is a difference of the quantifiable property between one played media and one not-played media, B is an integer value indicating a difference between a maximum and a minimum value of the quantifiable property, and C is the preset weights of the quantifiable property.

12. The method as claimed in claim 7, wherein receiving the vote information at the different times comprising:

determining whether the user leaves during one media playing;

determining whether the user votes to the media, if the user does not leave during the media playing;

determining whether the media is finished, if the user does not vote;

receiving a positive vote, if the media is finished;

determining whether the user stops the media, if the media is not finished; and receiving a negative vote, if the user stops the media.

13. The method as claimed in claim 12, further comprising receiving a positive vote and playing the media one by one in the favorite media list, if votes are submitted for the media.

14. The method as claimed in claim 12, further comprising playing the media in the favorite media list one by one, if the media is not stopped.

15. The method as claimed in claim 7, wherein determining the popularity according to the vote information comprises:

determining that vote information contains a positive vote;

adding one to the positive vote total, if the vote information is a positive vote;

adding one to the negative vote total if the vote information is a negative vote; and determining the popularity according to the positive vote total and the negative vote.

* * * * *